(12) United States Patent
Kotowski et al.

(10) Patent No.: US 8,736,190 B2
(45) Date of Patent: May 27, 2014

(54) PRIMARY SIDE PFC DRIVER WITH DIMMING CAPABILITY

(75) Inventors: Jeff Kotowski, Nevada City, CA (US); Charles Cai, San Jose, CA (US); Ranajit Ghoman, Santa Clara, CA (US)

(73) Assignee: ATMEL Corporation, San Jose, CA (US)

( * ) Notice: Subject to any disclaimer, the term of this patent is extended or adjusted under 35 U.S.C. 154(b) by 0 days.

(21) Appl. No.: 13/427,779

(22) Filed: Mar. 22, 2012

(65) Prior Publication Data

US 2013/0083578 A1  Apr. 4, 2013

Related U.S. Application Data

(63) Continuation of application No. 13/249,158, filed on Sep. 29, 2011.

(51) Int. Cl.
*H05B 41/16* (2006.01)

(52) U.S. Cl.
USPC ........ 315/247; 315/185 S; 315/291; 315/307; 315/312

(58) Field of Classification Search
USPC ...................... 315/247, 224, 185 S, 307–326
See application file for complete search history.

(56) References Cited

U.S. PATENT DOCUMENTS

| 8,040,070 | B2 | 10/2011 | Myers et al. |
| 2011/0062882 | A1 | 3/2011 | Kuo et al. |

OTHER PUBLICATIONS

Hwang, J. T., et al., "A Simple LED Lamp Driver IC with Intelligent Power-Factor Correction," IEEE International Solid-State Circuits Conference (ISSCC 2011), Feb. 22, 2011, 3 pages.

*Primary Examiner* — Tuyet Thi Vo
(74) *Attorney, Agent, or Firm* — Fish & Richardson P.C.

(57) ABSTRACT

A primary side PFC driver circuit is disclosed that includes a switch control circuit for commanding a switch to allow an inductor coupled to an output load (e.g., LEDs) to transfer energy provided by an input voltage source. The switch control circuit provides two signals for commanding the switch. A first signal having a first frequency, with a duty cycle in proportion to the input voltage amplitude, commands the switch to allow the average input current to be proportional to the input voltage amplitude. A second signal having a second frequency higher than the first frequency pulses the output load with substantially constant current pulses based on a value of the first signal (e.g., while the first signal is high). The current pulses produce a substantially constant current in the output load.

24 Claims, 5 Drawing Sheets

//PRIMARY SIDE PFC DRIVER WITH DIMMING CAPABILITY

CROSS-REFERENCE TO RELATED APPLICATIONS

This application is a continuation of and claims priority to U.S. application Ser. No. 13/249,158, entitled "Primary Side PFC Driver with Dimming Capability," filed on Sep. 29, 2011, the entire contents of which are incorporated herein by reference.

TECHNICAL FIELD

This disclosure relates generally to electronics and more particularly to Power-Factor-Correction (PFC) driver circuits for light emitting devices, such as a Light Emitting Diode (LED).

BACKGROUND

A switching-mode power supply (SMPS) can be used to drive a string of LEDs. The SMPS often includes a full-wave rectifier circuit for rectifying an AC input voltage into a DC voltage. The DC voltage provides input current to the LEDs. The SMPS can include PFC circuitry that controls the input current so that the input current waveform is in phase with the waveform of the AC input voltage (e.g., a sine wave). For a good power factor, the input current waveform will have the same shape and phase as the AC input voltage waveform, but will vary in magnitude or Root Mean Square (RMS) value. A good power factor can help efficient delivery of electrical power from the AC input voltage source to the LEDs.

Conventional SMPS circuits for LED drivers include one or two stage PFC converters, or a primary side driver system. Two stage PFC converters add cost and have lower efficiency due to the second stage of conversion. Single stage PFC converters require large electrolytic capacitors, which is bulky and unreliable and can shorten the life of the SMPS system. Single stage PFC converters are also not suitable for LED dimming applications. Primary side driver systems are susceptible to color shifting caused by changing current in the LEDs. In addition, since the system is off for a substantial portion of time the power factor is deteriorated.

SUMMARY

A primary side PFC driver circuit is disclosed that includes a switch control circuit for commanding a switch to allow an inductor coupled to an output load (e.g., LEDs) to transfer energy provided by an input voltage source. The switch control circuit provides two signals for commanding the switch. A first signal having a first frequency, with duty cycle in proportion to the input voltage amplitude, commands the switch to allow the average input current to be proportional to the input voltage amplitude. A second signal having a second frequency higher than the first frequency pulses the output load with substantially constant current pulses based on a value of the first signal (e.g., while the first signal is high).

Using two signals to command the switch at different frequencies provides the one or more light emitting devices with a substantially constant pulse current while controlling the input current so that the average input current waveform is in phase with the waveform of the rectified input voltage. The constant pulse current prevents the light emitting devices from color shifting and controlling the shape and phase of the average input current waveform provides good PFC.

Particular implementations of a primary side PFC LED driver with dimming can provide one or more of the following advantages: 1) good PFC in a single stage; 2) no large electrolytic capacitor (longer life for LEDs); 3) no transformer; 4) constant LED current (no color shift); 5) low cost implementation; and 6) dimming capability.

The details of one or more disclosed implementations are set forth in the accompanying drawings and the description below. Other features, aspects, and advantages will become apparent from the description, the drawings and the claims.

DETAILED DESCRIPTION

Exemplary Primary Side Driver Circuit

Figure 1:
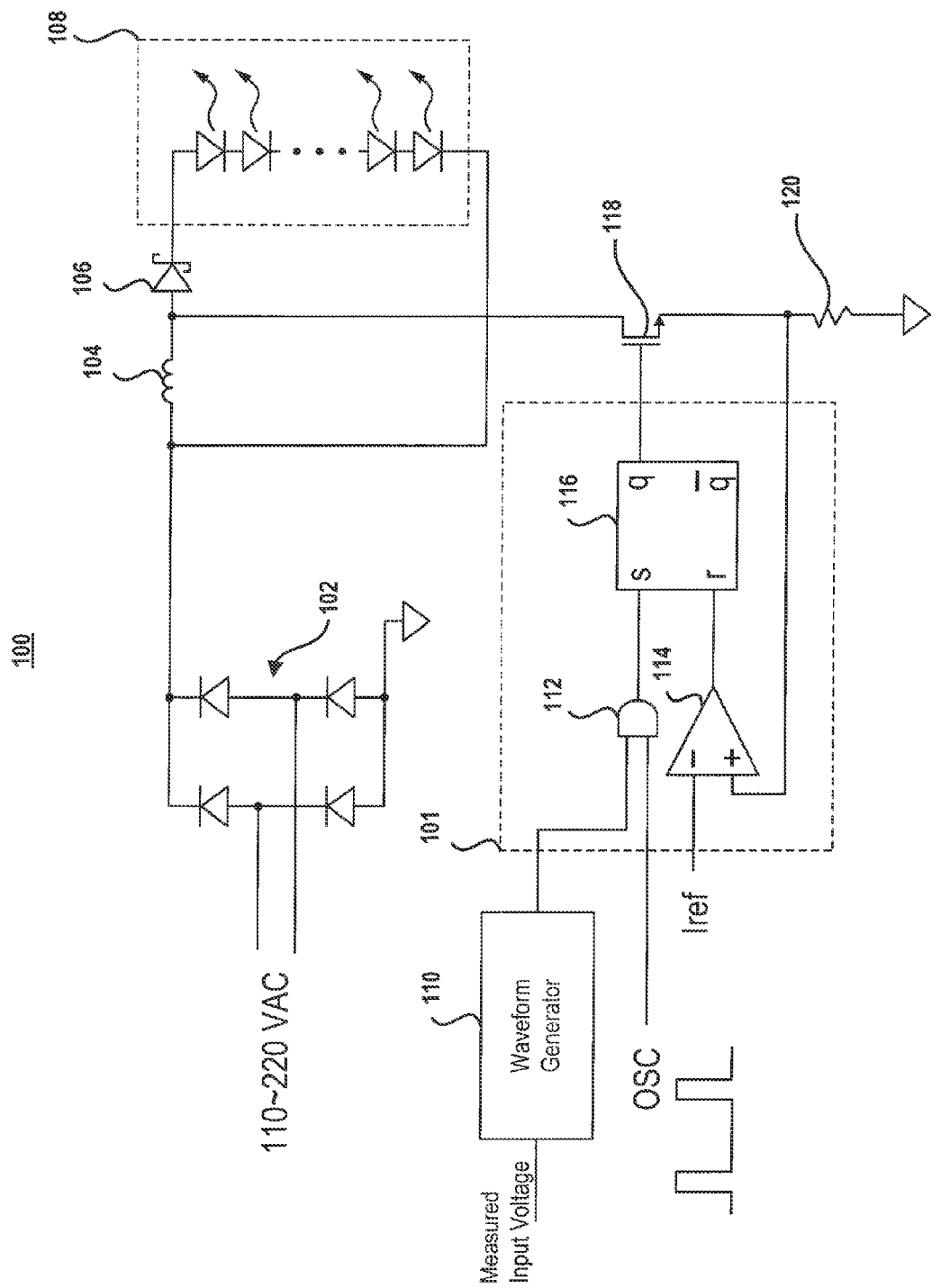
FIG. 1 is a simplified block diagram of an exemplary floating buck-boost power converter circuit for driving light emitting devices.

FIG. 1 is a simplified block diagram of an exemplary floating buck-boost power converter circuit 100 for driving light emitting devices, such as LEDs 108. In some implementations, converter circuit 100 can include full-wave rectifier circuit 102 (e.g., a diode bridge), inductor 104 and diode 106. Converter circuit 100 has an output voltage magnitude that is either greater than or less than the input voltage magnitude. The output voltage is adjustable based on the duty cycle of switch 118 (e.g., a MOSFET power transistor).

While switch 118 is in an "on" state, the rectified AC input voltage source (e.g., 110 VAC) is connected to inductor 104 and disconnected from LEDs 108 due to switch 118 providing a path to ground. This results in accumulating energy in inductor 104. While switch 118 is in an "off" state, inductor 104 is connected to LEDs 108, so current is transferred from inductor 104 to LEDs 108. This current is substantially constant so color shifting of LEDs 108 is avoided. Diode 106 (e.g., a Schotky diode) prevents negative voltage across LEDs 108 during the "on" state of switch 118.

In some implementations, switch control circuit 101 can include waveform generator 110, logic 112, comparator 114, latch 116 and sense resistor 120. Waveform generator 110 can be a full-wave rectified sine wave generator that is configured to generate an n-level Pulse Width Modulation (PWM) signal (e.g., 16-64 levels). In some implementations, the phase of the AC input voltage could be used to generate digitally a PWM signal. In other implementations, the AC input voltage can be measured with an analog-to-digital converter (ADC) and used as the PWM signal. In this example, the PWM signal is a 5-level-PWM-of-current ("5LPC") signal. The full-wave rectified AC input is 120 Hz (2×60 Hz), resulting in the 5LPC signal changing at about 600 Hz to 3000 Hz.

Logic 112 can be an "AND" gate or other suitable combination of logic devices. Logic 112 has a first input coupled to the output of waveform generator 110 and a second input coupled to a second waveform generator (e.g., an oscillator) that generates a second signal for commanding switch 118.

Figure 2:
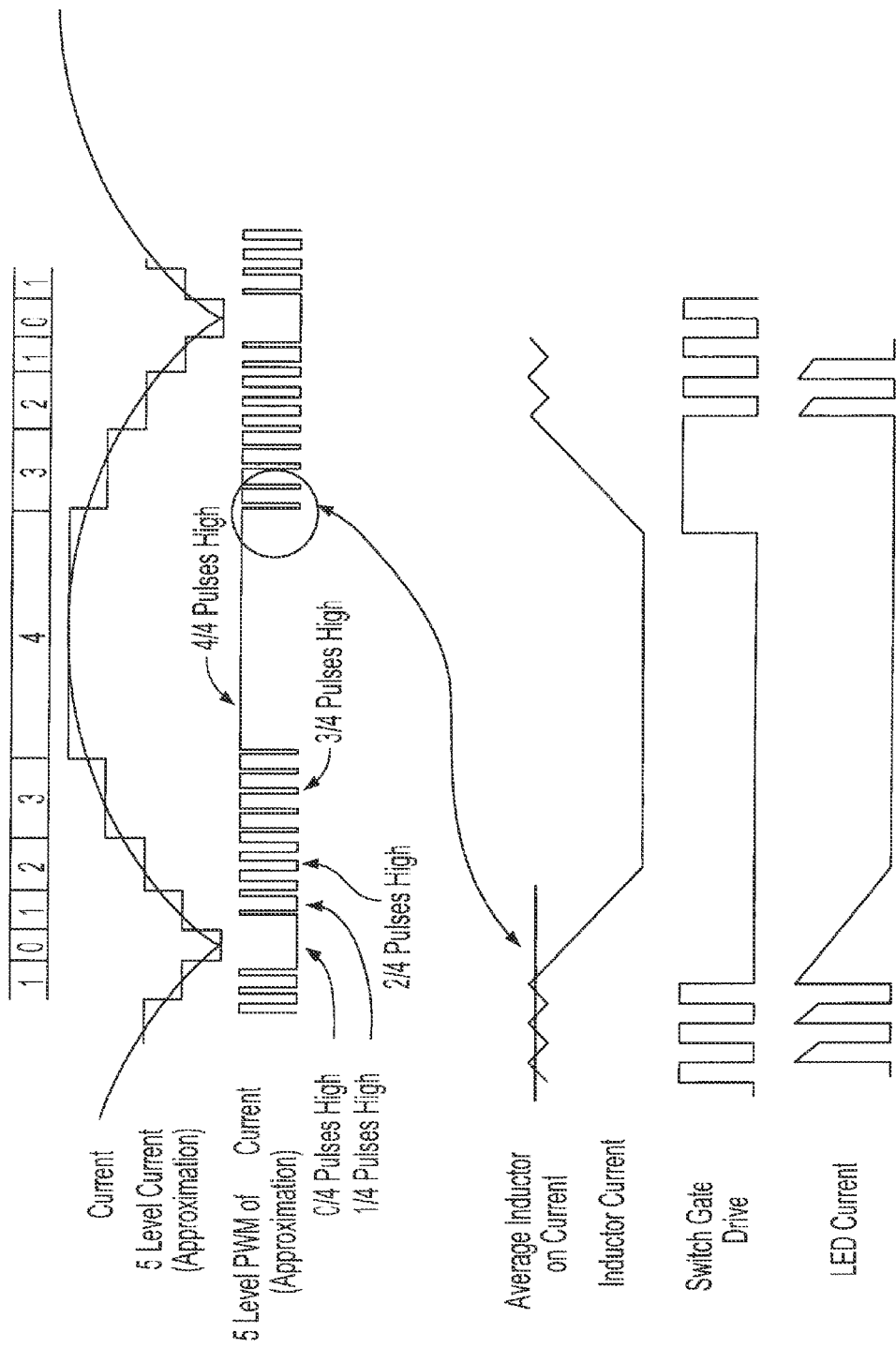
FIG. 2 illustrates exemplary waveforms for the converter circuit of FIG. 1.

As discussed in reference to FIG. 2, the second signal is provided to a command terminal of switch 118 during the "on" time of the 5LPC signal, and changes in the range of a few hundred kilohertz to a few megahertz. When the 5LPC signal is high, switch control circuit 101 is providing switch commands to switch 118. When the 5LPC signal is low, switch control circuit 101 is off.

The output of logic 112 is coupled to a first input of latch 116 (e.g., a set input of an SR flip-flop). An output of latch 116 is coupled to the command terminal of switch 118 (e.g., a gate terminal of a MOSFET power transistor). In this example, the output of latch 116 will remain latched (e.g., to logic "1") when the output of logic 112 is high. This results in switch 118 being turned on and inductor 104 being grounded through sense resistor 120. The voltage "sensed" across sense resistor 120 is input (negative input terminal) to comparator 114.

In implementations that include peak current control, comparator 114 compares the voltage across sense resistor 120 to a reference voltage Iref coupled to the other input terminal of comparator 114 (positive input terminal). Iref can be a constant voltage that sets the switching-mode supply peak current for LEDs 108. In other implementations, average current control circuitry can be used. The output of comparator 114 is used to reset latch 116 when the peak current is reached (e.g., applied to reset input of SR flip-flop). When the peak current is reached, the command voltage applied to switch 118 closes switch 118, thereby allowing current to flow from inductor 104 to LEDs 108.

In converter circuit 100, there is no large electrolytic capacitor at the output, so when switch 118 is "on" to charge inductor 104, LEDs 108 are off. Switch control circuit 101 implements a "PWM signal inside a PWM signal" to ensure a substantially constant pulse current flow into LEDs 108 during all stages of operation of circuit 100, thus preventing color shifting in LEDs 108 due to a varying current level when LEDs 108 are turned on.

Converter circuit 100 provides various advantages over conventional PFC driver circuits, including eliminating the large electrolytic capacitor, and providing good PFC and dimming capability in a single stage. Although switch control circuit 101 is shown as implemented with discrete components, the functionality of switch control circuit 101 could also be implemented in a programmable microcontroller.

Exemplary Waveforms

FIG. 2 illustrates exemplary waveforms for converter circuit 100 of FIG. 1. In these exemplary waveforms, a 5LPC waveform is assumed. The waveforms illustrate a 5LPC approximation that has been controlled to have same shape and phase as the AC input voltage. The PWM generated by waveform generator 110 (a sine wave) has a shorter duty cycle when the current is low and a longer duty cycle when the current is high. For example, at the peak current, four out four PWM pulses are high.

The waveforms illustrated in FIG. 2 are for a buck-boost topology of converter circuit 100. The waveforms illustrate the conversion from an analog current to a substantially constant current, and the "PWM signal inside a PWM signal," which provides a substantially constant pulse current to LEDs 108. LEDs 108 are pulsed with substantially constant current pulses, but the average LED current is synced (has the same phase and shape) with the rectified AC input voltage. Since there is no large electrolytic capacitor in parallel with LEDs 108, LEDS 108 will be off when switch 118 is on. The buck-boost topology will work even when the AC input voltage is lower than the output voltage and provide good PFC. Since LEDs 108 are off when inductor 104 is storing energy, the average current (brightness) of LEDs 108 will be smaller. The peak current flowing in LEDs 108 can be increased (e.g., increase Iref) to compensate for this effect.

LEDs 108 in floating buck-boost topology are only directly powered when inductor 104 is discharging its energy. This means that LEDs 108 will be off when inductor 104 is storing energy and the average inductor current will be smaller. This effect can be compensated by increasing the peak current of inductor 104. If it is desired to reduce the peak LED current to the average current, a small capacitor can be placed in parallel with LEDs 108 to provide continuous current to LEDS 108. For example, a 5 uF capacitor placed in parallel with LEDs 108 will allow less than 100 mV change in the LED voltage when switch 118 is running at 1 MHz with a 500 mA pulse current.

The "on" time of switch 118 is referred to as the duty cycle or "D" and the "off" time of switch 118 is "1-D." Because buck-boost converter 100 only delivers current to LEDs 108 during 1-D, the average current in LEDs 108 is equal to the average current in inductor 104 during D (as measured through sense resistor 120) multiplied by 1-D.

Exemplary Floating Buck Power Converter

Figure 3:
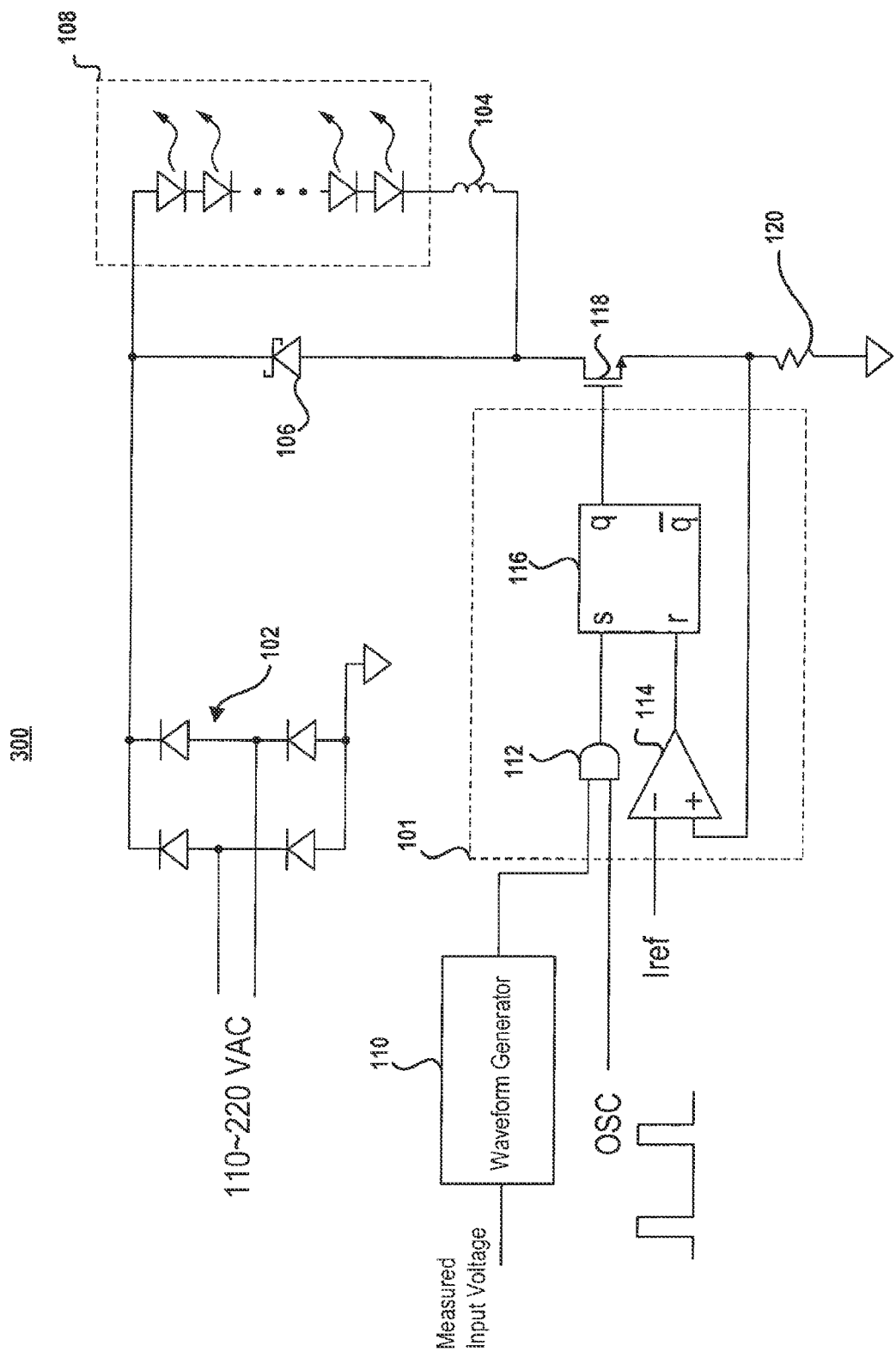
FIG. 3 is a simplified block diagram of an exemplary floating buck power converter circuit for driving light emitting devices.

FIG. 3 is a simplified block diagram of an exemplary floating buck power converter circuit 300 for driving light emitting devices, such as LEDs. Converter circuit 300 has a similar topology as the buck-boost converter circuit 100; except inductor 104 is coupled between LEDs 108 and switch 118 and diode 106 are each coupled in parallel with LEDs 108.

Figure 4:
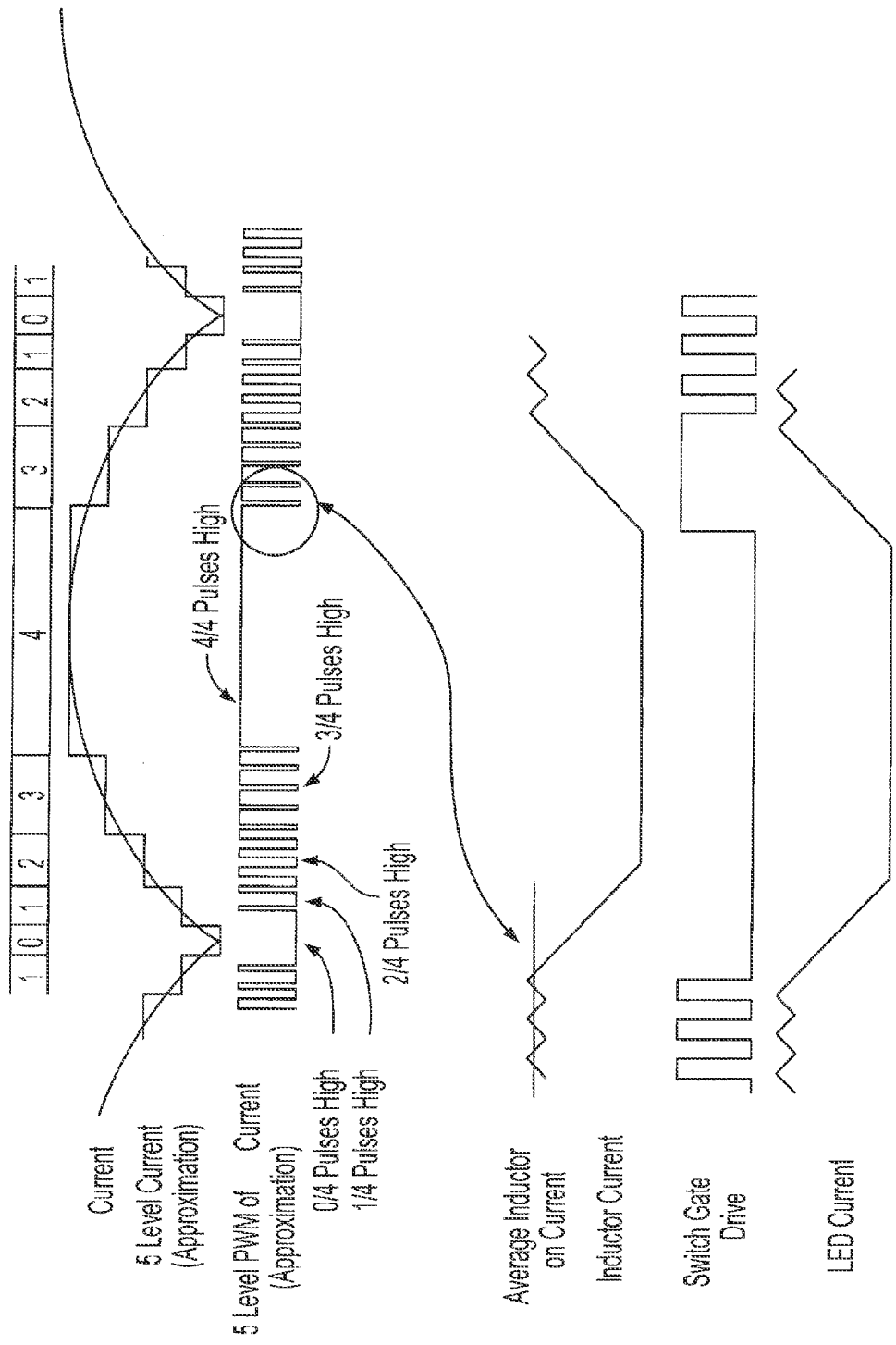
FIG. 4 illustrates exemplary waveforms for the converter circuit of FIG. 3.

Converter circuit 300 has all the benefits of the buck-boost converter circuit 100 shown in FIG. 1. However, since the floating buck converter topology of FIG. 3 only works when the input voltage is higher than the output voltage, there will be a portion of time where converter circuit 300 is off and the power factor will be poorer compared to converter circuit 100. When using converter circuit 300, LEDs 108 are always on when there is current in inductor 104. The corresponding waveforms for the floating buck converter topology are illustrated in FIG. 4.

When inductor 104 in the floating buck topology is storing energy, the current also flows through LEDs 108. When switch 118 is off, inductor 104 discharges its energy in the form of current through LEDs 108. Thus, LEDs 108 see the DC current plus a ripple current in inductor 104. The ripple current is reasonably small and can be further reduced by placing a small capacitor in parallel with LEDs 108, although it is not necessary in most applications.

Exemplary Waveform Generator

Converters 100, 300 use waveform generator 110 to generate an average current in LEDs 108 that follows the full-wave rectified AC input voltage waveform. There are several methods that can be implemented by waveform generator 110 to ensure proper phasing of the AC load to create a high quality PFC. Other methods are also possible.

Method #1

In a first method, the AC input voltage can be measured and used to create the "PWM inside a PWM" waveforms. A resistor divider network can measure voltage from the rectified AC input voltage. The PWM duty cycle is a duty cycle proportional to the measured voltage. The ratio of the voltage to duty cycle can be scaled (in real time) to allow dimming of the LED brightness.

Method #2

In a second method, zero crossing points of the AC input voltage is detected and used to synthesize a rectified voltage to be used for generating the PWM signal. With knowledge of the zero-to-zero crossing points, the period of the rectified sine wave can be determined. The amplitude of the rectified voltage can be set based on a brightness requirement for the application.

Method #3

In a third method, PWM current ramp rate is phase-locked to the rectified AC input voltage waveform. The ramp rate to charge inductor 104 in the floating buck topology is proportional to the voltage on the rectified AC input voltage. The maximum and minimum ramp rates can be detected. For example, the minimum ramp rate corresponds to the valleys (or zero crossing points) of the input voltage waveform and the maximum ramp rate corresponds to the peaks of the input voltage waveform. The determined maximum and minimum ramp rates can be used to phase correctly the "PWM signal inside the PWM signal."

Exemplary PFC LED Driver Process

Figure 5:
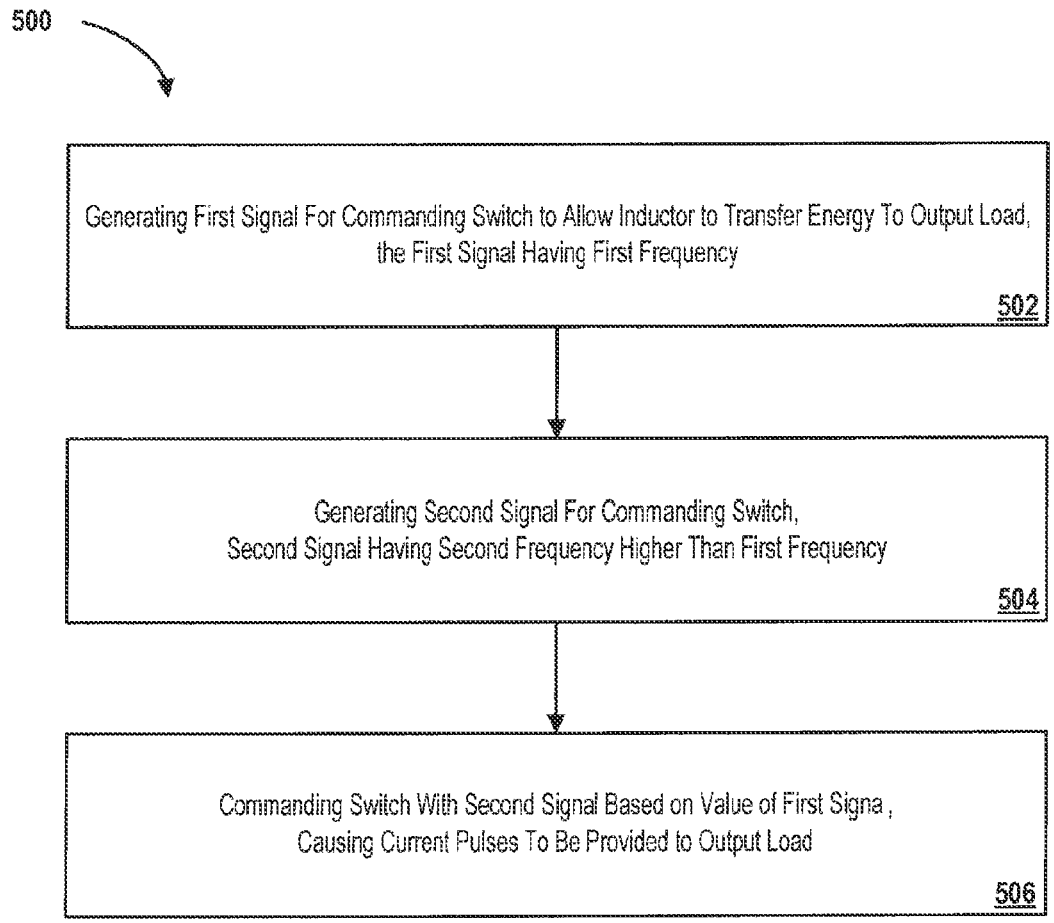
FIG. 5 is a flow diagram of an exemplary process for driving LEDs.

FIG. 5 is a flow diagram of process 500 for driving an output load (e.g., LEDs). Process 500 can be implemented by converters 100 or 300, as described in reference to FIGS. 1 and 3.

Process 500 can begin by generating a first signal for commanding a switch to allow an inductor coupled to the output load transfer energy provided by an input voltage source to the output load. The first signal has a first frequency with a duty cycle in proportion to the input voltage amplitude, and it commands the switch to make the average input current to be proportional to the input voltage amplitude (502). In some implementations, the first signal can be a PWM signal generated by a waveform generator. The first signal can be controlled to have the same shape and phase as the input voltage waveform.

Process 500 can continue by generating a second signal for commanding the switch. The second signal has a second frequency that is higher than the first frequency (504). For example, the second frequency can be orders of magnitude higher than the first frequency.

Process 500 can continue by commanding the switch with the second signal based on a value of the first signal (e.g., when the first signal is high) (506), thereby providing the output load with substantially constant current pulses, resulting in a substantially constant, pulse current in the output load. When the output load includes one or more LEDs, the substantially constant pulse current helps prevent color shifting of the LEDs.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A single stage, primary side, Power Factor Correction (PFC) driver circuit, the circuit comprising:
   a rectifier circuit configured to rectify an alternating input voltage;
   an inductor coupled in series with the rectifier circuit;
   a diode coupled in series with the inductor and an output load;
   a switch coupled to the inductor;
   a switch control circuit coupled to the switch and configured for:
      generating a first signal for commanding the switch to allow the inductor to transfer energy provided by a rectified input voltage to the output load, the first signal having a first frequency with a duty cycle in proportion to an amplitude of the rectified input voltage; generating a second signal for commanding the switch, the second signal having a second frequency that is higher than the first frequency; and
      commanding the switch with the second signal based on the first signal, the commanding causing a substantial constant pulse current to be provided to the output load.

2. The circuit of claim 1, where the rectifier circuit is a diode bridge.

3. The circuit of claim 1, where the diode is a Schotky diode.

4. The circuit of claim 1, further comprising:
   a capacitor coupled in parallel with the output load.

5. The circuit of claim 1, where the output load includes one or more light emitting diodes.

6. The circuit of claim 1, where the switch is a power transistor.

7. The circuit of claim 6, where the command terminal is a gate of the power transistor.

8. The circuit of claim 1, where the switch control circuit further comprises:
   a logic circuit configured for receiving a first waveform and a second waveform and providing an output based on the first waveform and the second waveform;
   a latch circuit having a first input coupled to the output of the logic circuit and an output coupled to a command terminal of the switch, the latch circuit configured for setting a command voltage on the command terminal based at least in part on the output of the logic circuit; and
   a comparator having a first input coupled to the switch, a second input coupled to a reference voltage and an output coupled to the latch circuit, where the comparator is configured for resetting the latch circuit based on a comparison of the first and second comparator inputs.

9. The circuit of claim 8, further comprising:
   a sense resistor coupled to the switch device and the first input of the comparator.

10. The circuit of claim 8, where the latch is a flip-flop.

11. A single stage, primary side, Power Factor Correction (PFC) driver circuit, the circuit comprising:
   a rectifier circuit configured to rectify an alternating input voltage;
   a diode coupled in parallel to the rectifier circuit and an output load;
   an inductor coupled in series with the output load;
   a switch coupled to the inductor;
   a switch control circuit coupled to the switch and configured for:
      generating a first signal for commanding the switch to allow the inductor to transfer energy provided by the rectified input voltage to the output load, the first signal having a first frequency with a duty cycle in proportion to an amplitude of the rectified input voltage; generating a second signal for commanding the switch, the second signal having a second frequency that is higher than the first frequency; and commanding the switch with the second signal based on the first signal, the commanding causing a substantial constant pulse current to be provided to the output load.

12. The circuit of claim 11, where the rectifier circuit is a diode bridge.

13. The circuit of claim 11, where the switch is a power transistor.

14. The circuit of claim 11, where the diode is a Schotky diode.

15. The circuit of claim 11, further comprising:
a capacitor coupled in parallel with the output load.

16. The circuit of claim 11, where the output load includes one or more light emitting diodes.

17. The circuit of claim 11, where the switch control circuit further comprises:
a logic circuit configured for receiving a first waveform and a second waveform and providing an output based on the first waveform and the second waveform;
a latch circuit having a first input coupled to the output of the logic circuit and an output coupled to a command terminal of the switch, the latch circuit configured for setting a command voltage on the command terminal based at least in part on the output of the logic circuit; and
a comparator having a first input coupled to the switch, a second input coupled to a reference voltage and an output coupled to the latch circuit, where the comparator is configured for resetting the latch circuit based on a comparison of the first and second comparator inputs.

18. The circuit of claim 17, further comprising:
a sense resistor coupled to the switch device and the first input of the comparator.

19. The circuit of claim 17, where the latch is a flip-flop.

20. The circuit of claim 17, where the command terminal is a gate of the power transistor.

21. A method of driving a light emitting diode (LED), comprising:
generating a first waveform for commanding a switch to allow an inductor coupled to the LED to transfer energy provided by an input voltage to the LED, the first waveform having a first frequency with a duty cycle in proportion to an amplitude of the input voltage;
generating a second waveform for commanding the switch, the second waveform having a second frequency that is higher than the first frequency, where a ratio of the input voltage to the duty cycle of the second waveform is scaled to allow dimming of LED brightness; and
commanding the switch with the second waveform based on the first waveform to provide a substantially constant current pulse to the LED.

22. A method of driving a light emitting diode (LED), comprising:
generating a first waveform for commanding a switch to allow an inductor coupled to the LED to transfer energy provided by an input voltage source to the LED, the first waveform having a first frequency with a duty cycle in proportion to an amplitude of the input voltage source;
generating a second waveform for commanding the switch, the second waveform having a second frequency that is higher than the first frequency, where the duty cycle of the second waveform is generated by:
detecting a zero crossing point of the input voltage source;
synthesizing a voltage for generating the second waveform using the detected zero crossing point; and
commanding the switch with the second waveform based on the first waveform to provide a substantially constant current pulse to the LED.

23. The method of claim 22, where an amplitude of the synthesized voltage can be set based on a brightness requirement for the LED.

24. A method of driving a light emitting diode (LED), comprising:
generating a first waveform for commanding a switch to allow an inductor coupled to the LED to transfer energy provided by an input voltage to the LED, the first waveform having a first frequency with a duty cycle in proportion to an amplitude of the input voltage;
generating a second waveform for commanding the switch, the second waveform having a second frequency that is higher than the first frequency; and
commanding the switch with the second waveform based on the first waveform to provide a substantially constant current pulse to the LED,
where a ramp rate for current charging the inductor is phase-locked to the input voltage, and maximum and minimum ramp rates corresponding to peaks and valley, respectively, of the input voltage, are used to phase the first and second waveforms.

* * * * *